United States Patent [19]

Kobayashi

[11] Patent Number: 4,680,487
[45] Date of Patent: Jul. 14, 1987

[54] INPUT/OUTPUT PORT INCLUDING AUXILIARY LOW-POWER TRANSISTORS

[75] Inventor: Mikio Kobayashi, Kawasaki, Japan

[73] Assignee: Ricoh Company, Ltd., Tokyo, Japan

[21] Appl. No.: 698,033

[22] Filed: Aug. 19, 1986

[30] Foreign Application Priority Data

Aug. 19, 1985 [JP] Japan .................. 60-125758[U]

[51] Int. Cl.[4] ........................................ H03K 17/687
[52] U.S. Cl. ...................... 307/475; 307/443; 307/451; 307/469; 307/200 B; 365/227
[58] Field of Search .............. 307/440, 443, 448, 465, 307/468–469, 475, 200 B, 577, 579, 584–585, 296 R, 451; 365/227; 364/489–491

[56] References Cited

U.S. PATENT DOCUMENTS

| | | | |
|---|---|---|---|
| 4,301,383 | 11/1981 | Taylor | 307/303 X |
| 4,306,163 | 12/1981 | Blume, Jr. et al. | 307/475 |
| 4,353,104 | 10/1982 | Takayuki | 307/475 X |
| 4,465,945 | 8/1984 | Yin | 307/473 |
| 4,479,067 | 10/1984 | Fujita | 307/475 |
| 4,523,106 | 6/1985 | Tanizawa et al. | 364/490 X |
| 4,581,551 | 4/1986 | Campbell, Jr. | 307/446 X |
| 4,591,742 | 5/1986 | Morito | 307/475 |
| 4,621,208 | 11/1986 | van Tran | 307/443 X |

OTHER PUBLICATIONS

Harrod et al, "Ungated Common I/O Buffer for Card Testing", *IBM T.D.B.*, vol. 21, No. 6, Nov. 1978, pp. 2476–2477 (307/475).

*Primary Examiner*—Stanley D. Miller
*Assistant Examiner*—D. R. Hudspeth
*Attorney, Agent, or Firm*—Oblon, Fisher, Spivak, McClelland, & Maier

[57] ABSTRACT

A input/output port for use in a device such as a central processing unit includes a common input/output terminal which serves as an input terminal when the port is set in a data input mode and as an output terminal when the port is set in a data output mode. The common terminal is connected to the junction between a pair of transistors connected in series between a high voltage source and ground. Also provided is a third transistor having a lower capability or power than the pair of first and second transistors and connected between the high voltage source and the common terminal. During data output mode, the pair of first and second transistors is turned on and off in a complementary fashion in accordance with data to be output. During data input mode, the pair of first and second transistors is maintained turned off and the third transistor is set either turned off or turned on.

6 Claims, 4 Drawing Figures

INPUT/OUTPUT PORT INCLUDING AUXILIARY LOW-POWER TRANSISTORS

BACKGROUND OF THE INVENTION

1. Field of the Invention

This invention relates to an input/output port, and, in particular, to an input/output port device for use in a microcomputer, gate array, or the like.

2. Description of the Prior Art

In a microcomputer system or the like, use is typically made of an input/output port as an interface between a central processing unit or simply CPU and various input/output devices. One typical prior art input/output port is shown in FIG. 3. The input/output port shown in FIG. 3 includes a common input/output terminal P, which is commonly used for data input and for data output and to which is connected a first transistor $Q_1$ for pull-up function and a second transistor $Q_2$ for output function. The first transistor $Q_1$ is comprised of a P-channel MOS transistor which has its source connected to a high level voltage source $V_{DD}$, its drain connected to the common input/output terminal P and its gate connected to ground. The second transistor $Q_2$ is comprised of an N-channel MOS transistor which has its drain connected to the common input/output terminal P and its source connected to a low level voltage source $V_{SS}$ (or ground GND in the illustrated example).

The mode of operation between data input and data output is designated by a data supplied to a data direction register 3 through a data bus DB. That is, if a data "1" is supplied into the data direction register 3, the register 3 establishes a data output designation condition by supplying a high level signal to the inverting input terminal of a NOR gate 7. Under this condition, the data on the data bus DB is temporarily stored in a port latch 4, which supplies a high level or low level signal depending on the data on the data bus DB to the non-inverting input terminal of the NOR gate 7. At the NOR gate 7, if the output from the data direction register 3 is high and the output from the port latch 4 is low, then the NOR gate 7 supplies a high level output to the gate of the second transistor $Q_2$, thereby causing the second transistor $Q_2$ to be turned on. On the other hand, if a data "0" is written into the data direction resister 3, whereby the register 3 establishes a data input designation condition, the output from the NOR gate 7 becomes low to render the second transistor $Q_2$ turned off irrespective of the state of the output from the port latch 4. In this manner, the second transistor $Q_2$ is turned on or off in accordance with the data supplied from the port latch 4 only when the data direction register 3 designates a data output mode. Thus, under this condition, the signal at the common input/output terminal P becomes low or high, whereby the common input-/output terminal P effectively serves as an output terminal.

On the other hand, if the data direction register 3 designates the data input mode and thus its output is at low level, the second transistor $Q_2$ is maintained to be turned off, so that the common input/output terminal P is maintained at high impedance condition, thereby effectively serving as an input terminal. Under this condition, data supplied to the common input/output terminal P from an external input/output device is lead onto the data bus DB via an input buffer 5.

The input/output port shown in FIG. 3 includes the first transistor $Q_1$ for pull-up function, and, thus, during a data input mode, it allows to input data even from such an external input/output device which cannot by itself output a high level signal, such as an open drain output stage, However, when the common input/output terminal P is used as an input terminal, if the common input/output terminal P is shorted to ground through an external switch, there will be created a constant flow of current through the first transistor $Q_1$, which causes a problem of increased power consumption. In order to limit the unnecessary current flowing through the first transistor $Q_1$, it is only necessary to lower the capability or power of the first transistor $Q_1$. For this purpose, use may be made of a transistor having a high internal impedance for the first transistor $Q_1$. However, if use is made of a low power device for the first transistor $Q_1$, the transition from the on-state to the off-state of the second transistor $Q_2$, to which current is supplied through the first transistor $Q_1$, becomes slower. That is, under this condition, when the common input/output terminal P is used as an output terminal, it takes time for the signal at the terminal P to change from its high level to low level, thereby creating another problem of a reduction in responsiveness.

FIG. 4 shows another prior art input/output port which is an improvement over the structure shown in FIG. 3. In the input/output port shown in FIG. 4, the gate of the first transistor $Q_1$ is not connected to ground, and, instead, it is connected to receive an output from a NAND gate 6 which has its one input terminal connected to the data direction register 3 and its other input terminal connected to the port latch 4. With this structure, in the case when the common input/output terminal P is used as an input terminal, if a data "0" is written into the data direction register 3, thereby causing the output from the register 3 to be low level, or the output from the port latch 4 is forced to be low at level, the first transistor $Q_1$ is maintained to be off, so that the unnecessary current flowing at the time when the terminal P is shorted to ground through an external switch is decreased. On the other hand, in the case where data is to be input using the common input/output terminal P as an input terminal, a data "1" is written into the data direction register 3, thereby causing the output from the register 3 to be high at level, and, at the same time the output from the port latch 4 is forced to be high level. Under this condition, the first transistor $Q_1$ is turned on to provide a pull-up function, and, at the same time, the second transistor $Q_2$ is maintained off.

However, also in the structure shown in FIG. 4, the problem of presence of unnecessary current during data input mode still remains. That is, if the power of each of the transistors $Q_1$ and $Q_2$ is set to be lower, the unnecessary current during data input mode can be made smaller; however, the transition from the high level to the low level at the terminal P while the common input-/output terminal P is used as an output terminal becomes slower, thereby producing a problem of a reduction in responsiveness. On the other hand, if the power of each of the transistors $Q_1$ and $Q_2$ is increased, i.e., if the internal impedance of each of the transistors $Q_1$ and $Q_2$ is set lower, there is brought about an increase of unnecessary current during data input mode.

SUMMARY OF THE INVENTION

In accordance with the present invention, there is provided an input/output port including a common input/output terminal which selectively serves as an input terminal or output terminal depending on whether an input or output mode is designated. The common input/output terminal is connected to a junction between a pair of first and second transistors which are connected in series between high and low voltage sources. Also provided is a third transistor which is lower in power than the first and second transistors and which is connected between the high voltage source and the common input/output terminal. During data output mode, the first and second transistors are turned on and off in a complementary fashion in accordance with a data to be output. On the other hand, during data input mode, the first and second transistors are maintained off; whereas, the third transistor is maintained either on or off. With this structure, during data input mode, the low power third transistor is activated as a pull-up transistor; on the other hand, during data output mode, the high power first and second transistors are activated. Thus, the unnecessary current during data input mode is minimized and the transition of state takes place at high speed during data output mode.

It is therefore a primary object of the present invention to obviate the disadvantages of the prior art as described above and to provide an improved input/output port.

Another object of the present invention is to provide an improved input/output port having a minimized unnecessary current during data input mode.

A further object of the present invention is to provide an improved input/output port which can change state at high speed during data output mode.

A still further object of the present invention is to provide an improved input/output port excellent in performance, fast in speed and low in power consumption.

Other objects, advantages and novel features of the present invention will become apparent from the following detailed description of the invention when considered in conjunction with the accompanying drawings.

DESCRIPTION OF THE PREFERRED EMBODIMENTS

Figure 1:
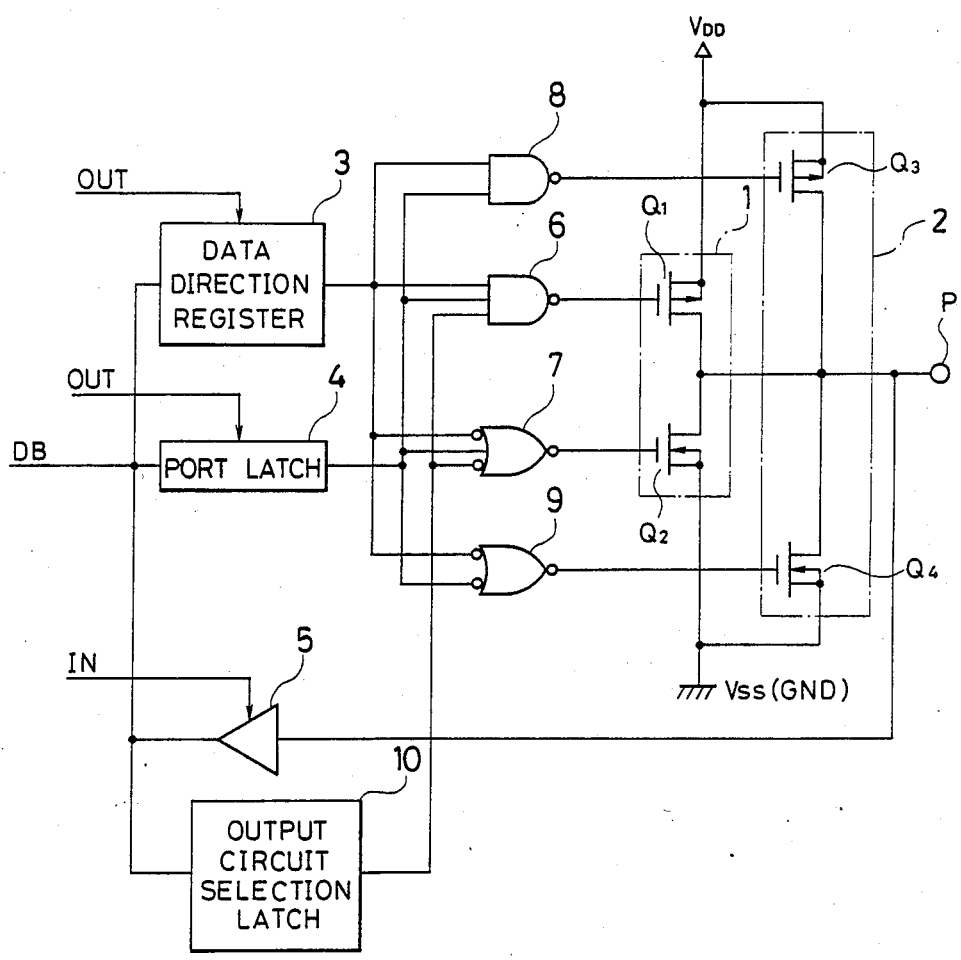
FIG. 1 is a schematic illustration showing an input/output port constructed in accordance with one embodiment of the present invention.

Referring now to FIG. 1, there is shown an input/output port constructed in accordance with one embodiment of the present invention. As shown, the input/output port includes a common input/output terminal P which is connected to first and second output circuits 1 and 2 and also to an input buffer 5. The first output circuit 1 includes a first transistor $Q_1$, which is comprised of a P-channel MOS transistor having its drain connected to the common terminal P and its source connected to a high voltage source $V_{DD}$, and a second transistor $Q_2$ which is comprised of an N-channel MOS transistor having its drain connected to the common terminal P and its source connected to a low voltage source $V_{SS}$ (or ground GND in the present example). The transistors $Q_1$ and $Q_2$ are selected to be relatively higher in power or capability. On the other hand, the second output circuit 2 includes a pair of third and fourth transistors $Q_3$ and $Q_4$ which are connected in a manner similar to the first and second transistors $Q_1$ and $Q_2$. However, the transistors $Q_3$ and $Q_4$ are selected to be relatively lower in power or capability.

Also provided is an input buffer 5 which is controlled by an IN signal supplied, for example, from a microcomputer unit when the common input/output terminal P is to be used as an input terminal and which serves to transfer the data supplied to the terminal P from an external input/output device to the data bus DB. Also provided is a data direction register 3 which is controlled by an OUT signal supplied, for example, from the microcomputer unit and which determines whether the terminal P to serve as an input terminal or output terminal depending on the data supplied thereto via the data bus DB. The data direction register 3 has its output terminal connected to a pair of NAND gates 6 and 8 and also to a pair of NOR gates 7 and 9. There is also provided a port latch 4 which is also controlled by the OUT signal to read the data on the data bus DB, and, thus, it basically has a function of temporarily storing the data to be output via the terminal P when the common input/output terminal P is to be used as an output terminal. The output terminal of the port latch 4 is connected to the pair of NAND gates 6 and 8 and also to the non-inverting input terminals of the NOR gates 7 and 9.

The NAND gate 8 has its output terminal connected to the gate of the third transistor $Q_3$ to control its on/off state. The NAND gate 6 has its gate connected to the gate of the first transistor $Q_1$ to control its on/off state. The NOR gate 7 has its output terminal connected to the gate of the second transistor $Q_2$ to control its on/off state. And, the NOR gate 9 has its output terminal connected to the gate of the fourth transistor $Q_4$ to control its on/off state.

Also provided in the structure of FIG. 1 is an output circuit selection latch 10 which controls the selection of the first and second output circuits 1 and 2 in response to a data received from the data bus DB. The output circuit selection latch 10 has its output terminal connected to the NAND gate 6 and also to the NOR gate 7.

Now, the operation of the input/output port shown in FIG. 1 will be described with reference to the following table I.

TABLE I

|  | DATA INPUT MODE | | DATA OUTPUT MODE | |
| --- | --- | --- | --- | --- |
| Register 3 Output | L | H | H | H |
| Latch 4 Output | — | H | H | L |
| Latch 10 Output | — | L | H | H |
| State of $Q_1$ | OFF | OFF | ON | OFF |
| State of $Q_2$ | OFF | OFF | OFF | ON |
| State of $Q_3$ | OFF | ON | ON | OFF |
| State of $Q_4$ | OFF | OFF | OFF | ON |
| State of terminal P | A | B | H | L |

Here, A: high impedance state, and B: pull-up state.

At first, in a data input mode, i.e., when a data being supplied to the common input/output terminal P externally, the output from the data direction register 3 is set at either low or high level. When the output from the data direction register 3 is set at low level, outputs from the AND gates 6 and 8 become low level irrespective of the state of each of the outputs from the port latch 4 and the output circuit selection latch 10, so that the NOR gates 7 and 9 supply high level outputs, thereby causing all of the transistors $Q_1$ through $Q_4$ to be turned off. As a result, the common input/output terminal P is set in a high impedance state A, thereby establishing a condition in which the data supplied from an external input/output device can be transferred to the data bus DB through the input buffer 5. In addition, under this condition, since the transistors $Q_1$ and $Q_3$ connected between the high level voltage source $V_{DD}$ and the common input/output terminal P are maintained off, even if a short is created between the common terminal P and ground by an external switch, there will be no unnecessary current flowing through the transistors $Q_1$ and $Q_3$.

On the other hand, when it is set such that the outputs from the data direction register 3 and the port latch 4 are high and the output from the output circuit selection latch 10 is low, the third transistor $Q_3$ is turned on with the remaining three transistors $Q_1$, $Q_2$ and $Q_4$ being turned off. This corresponds to a condition B in which the third transistor $Q_3$ provides a pull-up function, which allows to take data in even from such an external input/output device having an open drain output stage as described before. In other words, in the case where the output terminal of an external input/output device having an open drain output stage is connected to the common input/output terminal P, the state at the common input/output terminal P becomes low level when an open drain transistor provided in the output stage of the external input/output device is turned on; whereas, the state at the common input/output terminal P becomes high level through the third transistor $Q_3$ when the open drain transistor provided in the output stage of the external input/output device is turned off. Of importance, since the third transistor $Q_3$ has a relatively low power, even if a short circuit is formed between the common terminal P and ground with the third transistor $Q_3$ being turned on, the undesired current flowing through the third transistor $Q_3$ can be limited to a minimum.

On the other hand, during data output mode, the output from the data direction register 3 is set at high level and the output from the output circuit selection latch 10 is also set at high level. Under this condition, the data on the data bus DB is sequentially supplied into the port latch 4. If the output from the port latch 4 is at high level, then the first and third transistors $Q_1$ and $Q_3$ are turned on and the second and fourth transistors $Q_2$ and $Q_4$ are turned off, so that the state at the common input/output terminal P becomes high level. On the other hand, if the output from the port latch 4 is at low level, then the first and third transistors $Q_1$ and $Q_3$ are turned off and the second and fourth transistors $Q_2$ and $Q_4$ are turned on, so that the state at the common terminal P becomes low level. In this manner, during data output mode, in addition to the low power transistors $Q_3$ and $Q_4$ in the second output circuit 2, the high power transistors $Q_1$ and $Q_2$ in the first output circuit 1 operate in association with the low power transistors $Q_3$ and $Q_4$, so that the state change of a signal at the common input/output terminal P, in particular transitional change from high level to low level, takes place at an increased speed.

Figure 2:
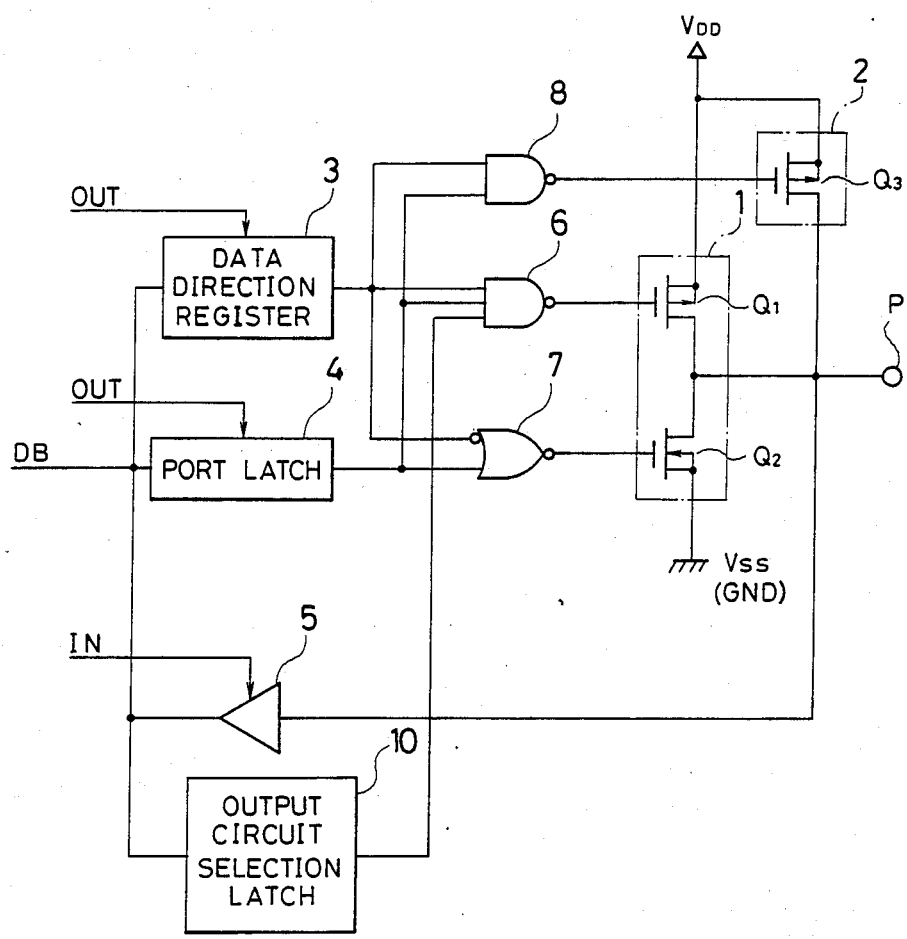
FIG. 2 is a schematic illustration showing an input/output port constructed in accordance with another embodiment of the present invention.
Figure 3:
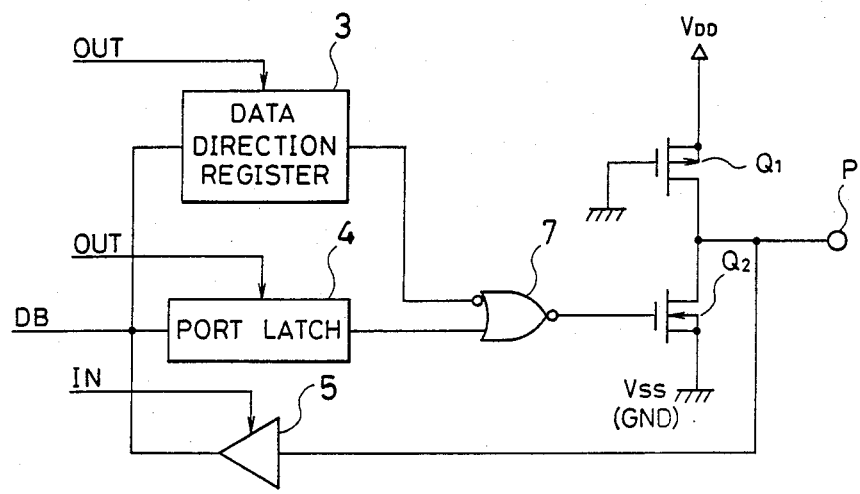
FIGS. 3 and 4 are schematic illustrations showing typical prior art input/output ports.
Figure 4:
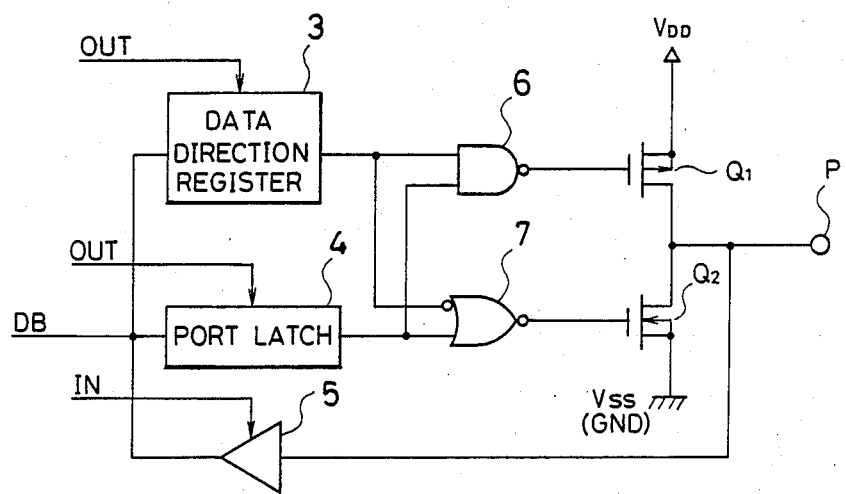

FIG. 2 shows another embodiment of the present invention, which is very similar in many respects to the previous embodiment shown in FIG. 1. Thus, like elements are indicated by like numerals. The present embodiment differs from the previous embodiment shown in FIG. 1 in that the fourth transistor $Q_4$ in the second output circuit 2 is eliminated and, in association therewith, the NOR gate 9 for controlling the fourth transistor $Q_4$ is likewise eliminated. In addition, the NOR gate 7 for controlling the second transistor $Q_2$ has less inputs correspondingly. The operation of the input/output port shown in FIG. 2 will be described with reference to the following table II.

TABLE II

|  | DATA INPUT MODE | | DATA OUTPUT MODE | |
|---|---|---|---|---|
| Register 3 Output | L | H | H | H |
| Latch 4 Output | — | H | H | L |
| Latch 10 Output | — | L | H | H |
| State of $Q_1$ | OFF | OFF | ON | OFF |
| State of $Q_2$ | OFF | OFF | OFF | ON |
| State of $Q_3$ | OFF | ON | ON | OFF |
| State of terminal P | A | B | H | L |

Here, A: high impedance state, and B: pull-up state.

During data input mode, similarly with the previous embodiment shown in FIG. 1, the output from the data direction register 3 is set at either low or high level. If the output from the data direction register 3 is set at low level, the outputs from the NAND gates 6 and 8 become high level irrespective of the state of outputs from the port latch 4 and the output circuit selection latch 10 and the output from the NOR gate 7 becomes low level, so that all of the transistors $Q_1$ through $Q_4$ are turned off and the high impedance state A is established at the common input/output terminal P, thereby allowing the data supplied from an external input/output device to be transferred to the data bus DB through the input buffer 5.

On the other hand, if it is so set that the outputs from the data direction register 3 and the port latch 4 are high level and the output from the output circuit selection latch 10 is low level, then the third transistor $Q_3$ is turned on with the remaining transistors $Q_1$ and $Q_2$ being turned off. This corresponds to the condition B in which the third transistor $Q_3$ provides a pull-up function.

During data output mode, both of the outputs from the data direction registration register 3 and the output circuit selection latch 10 are set at high level, and similarly with the previous embodiment shown in FIG. 1, when the data on the data bus DB is sequentially supplied into the port latch 4, the first and second transistors $Q_1$ and $Q_2$ are turned on and off in a complementary fashion in accordance with the output from the port latch 4, and, at the same time, the third transistor $Q_3$ is turned on and off in a manner similar to the first transistor $Q_1$.

In this embodiment shown in FIG. 2, the low power transistor $Q_4$ is eliminated from the structure shown in FIG. 1. However, this fourth transistor $Q_4$ has nothing to do with the characteristic of the data input mode. Moreover, in the case of data output mode, if the second transistor $Q_2$ is sufficiently higher in power, then there will be no appreciable degradation in the output state change characteristic due to the absence of the fourth transistor $Q_4$.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An input/output port selectively having a data input mode and a data output mode, comprising:
   a common input/output terminal for receiving or supplying data from or to an external device;
   a pair of first and second transistors connected in series between a first voltage source and a second voltage source which is lower in voltage level than said first voltage source, a junction between said pair of first and second transistors being connected to said common input/output terminal;
   a third transistor lower in power than said pair of first and second transistors and connected between said first voltage source and said common input/output terminal;
   first control means for controlling said pair of first and second transistors such that said pair of first and second transistors are turned on and off in a complementary fashion in accordance with data to be output when said port is set in the data output mode; and
   second control means for controlling said pair of first and second transistors and also said third transistor such that said pair of first and second transistors are maintained turned off and said third transistor is set either turned off or on when said port is set in the data input mode.

2. The port of claim 1 further comprising a fourth transistor connected between said common input/output terminal and said second voltage source, whereby said fourth transistor is controlled to be turned on and off in a complementary fashion together with said third transistor when said port is set in the data output mode and to be maintained turned off when said port is set in the data input mode.

3. The port of claim 2 wherein said fourth transistor is also lower in power than said pair of first and second transistors.

4. The port of claim 3 wherein each of said first through fourth transistors is comprised of a MOS transistor.

5. The port of claim 4 wherein said first and third transistors are P-channel MOS transistors and said second and fourth transistors are N-channel MOS transistors.

6. The port of claim 5 wherein said first voltage source is a high voltage source and said second voltage source is ground.

* * * * *

UNITED STATES PATENT AND TRADEMARK OFFICE
CERTIFICATE OF CORRECTION

PATENT NO.   :   4,680,487
DATED        :   July 14, 1987
INVENTOR(S)  :   Mikio KOBAYASHI It is certified that error appears in the above-identified patent and that said Letters Patent is hereby corrected as shown below:

The serial number is printed incorrectly on the Letters Patent.
Should read as follows:

898,033

Signed and Sealed this

Thirteenth Day of October, 1987

Attest:

DONALD J. QUIGG

Attesting Officer

Commissioner of Patents and Trademarks